United States Patent [19]

Cooper et al.

[11] Patent Number: 5,920,688
[45] Date of Patent: Jul. 6, 1999

[54] METHOD AND OPERATING SYSTEM FOR MANIPULATING THE ORIENTATION OF AN OUTPUT IMAGE OF A DATA PROCESSING SYSTEM

[75] Inventors: Michael R. Cooper, Austin, Tex.; Ravi Ravisankar, Boca Raton, Fla.

[73] Assignee: International Business Machines Corporation, Armonk, N.Y.

[21] Appl. No.: 08/555,658

[22] Filed: Nov. 13, 1995

[51] Int. Cl.$^6$ .................................................. G06T 3/00
[52] U.S. Cl. ....................................................... 395/137
[58] Field of Search .................................. 395/137, 133, 395/101, 102, 109, 111, 114–117, 118, 325, 501

[56] References Cited

U.S. PATENT DOCUMENTS

| | | | |
|---|---|---|---|
| 4,703,515 | 10/1987 | Baroody, Jr. | 382/46 |
| 4,947,344 | 8/1990 | Hayashi et al. | 395/137 |
| 5,063,526 | 11/1991 | Kagawa et al. | 382/46 |
| 5,081,700 | 1/1992 | Crozier | 395/137 |
| 5,390,301 | 2/1995 | Scherf | 395/325 |
| 5,394,523 | 2/1995 | Harris | 395/501 |

OTHER PUBLICATIONS

YAO "Borland C++ 4.0 Programming For Windows" pp. 119–130, 735–737 (1994).

Feedak, et al., "Logical Rotation and Reflection of Graphic Raster Images," IBM Information Disclosure Statement, vol. 25, No. 10, Mar. 1983, pp. 5001–5002.

Primary Examiner—Almis R. Jankus
Attorney, Agent, or Firm—Mark S. Walker; Brian F. Russell; Andrew J. Dillon

[57] ABSTRACT

An operating system for manipulating the orientation of an output image of a data processing system provides operating system support to rotate an image output to a device driver at rendering time for printing in portrait or landscape mode and for displaying the image in increments of 90 decree rotations. A user or system sets a rotation for all output images sent to the peripheral device, regardless of what application provides the image, and the operating system performs the rotation on all output images sent to the particular output device.

9 Claims, 5 Drawing Sheets

METHOD AND OPERATING SYSTEM FOR MANIPULATING THE ORIENTATION OF AN OUTPUT IMAGE OF A DATA PROCESSING SYSTEM

BACKGROUND OF THE INVENTION

1. Technical Field

The present invention relates in general to an improved computer operating system, and in particular relates to an improved computer operating system for manipulating the orientation of an output image of the computer. Still more particularly, the present invention relates to a computer operating system that provides multiple degrees of rotation to a graphic image output from the computer to a peripheral device, such as a display.

2. Description of the Related Art

Computer graphics involves the generation, representation, manipulation, processing, and display of data by a computer. Today, many computers, particularly those in the PC, microcomputer, or workstation categories, have graphics functionality. Their central components are a graphical display device, usually a cathode ray tube (CRT), and/or other output devices such as printers or video players, and one or more input devices such as a keyboard or mouse. Computer graphics encompasses a wide variety of applications. These applications include computer-aided design, scientific visualization, computer animation, 3-dimensional imaging, and digital video applications.

Computer graphics systems comprise several different output components in which to display computer-generated images. These components are classified into hard copy technologies and display technologies. Hard copy technologies include printers, pin plotters, dot matrix printers, laser printers, ink-jet plotters, etc. These devices use either a raster or vector style of drawing. The raster style uses discreet dots, and the vector style uses a continuous drawing motion. The most common component of graphics displays has been the CRT, but other graphics displays include liquid crystal displays, light emitting diode displays and plasma panels. A raster CRT scans the image, one row at a time, from a matrix whose elements correspond to a pixel, or point on the screen. This matrix is referred to as the frame buffer and allows for a constant refresh rate, usually sixty times per second.

An operating system is a set of programs that controls the operation of a computer. An operating system's primary function is the management of all hardware and software resources in the computer. It manages processors, memory, I/O devices, and networks. The operating system is accessed by a collection of system calls provided by an application program interface (API). System calls provide the mechanism for an application program to obtain services from the system. The operating system includes a file system and terminal handling for implementing system calls. The operating system also includes basic capabilities including interprocess communication, memory management, and process management. The operating system interfaces at its lowest level with device drivers that provide the interface directly with external peripheral devices, particularly I/O devices. For each of these peripheral devices, such as a disk drive, network adapter, laser printer, or CRT display, a specialized device driver must exist having specialized capability to communicate with that particular peripheral device. Device drivers accept requests to read or write data, or determine the status of the hardware, or to display a graphic image.

In traditional graphics systems, image data are stored either as Cartesian coordinates or as vectors that define geometric objects such as a polygon. This data may be manipulated by a graphics processor through the geometrical transformations of scaling, translating, and rotating in a reference system known as the world coordinate system. Physical devices use their own coordinate systems known as screen coordinate systems. In order to ready the image for display, a viewing transformation takes place, which changes the image data to the corresponding device-specific screen coordinates. A window or portion of the image presented by the application is chosen to be shown in an area of the display. Because some of the image data could be outside this window, a clipping operation is necessary.

In order to render graphic images, rasterization is performed by a graphics engine in rendering the image to produce standard pixel data that can then be processed by the output device's device driver. The graphics engine receives image data from an application executing in the computer for display or printing. As used herein, a graphics engine is a combination of graphics hardware and software for rendering a display image. A complex picture image is received from an application program, typically mapped in Cartesian coordinates or as vectors. The graphics engine then renders the image as graphics primitives, such as lines, polygons, and character strings that are output to the output device's device driver.

Traditionally, the application program, system or user may further specify that the image be rotated at the output device. Today's operating systems require the device driver to manage its output stream of data to its output device, including any such requested rotation of the image. Therefore, most available printer device drivers support their own translation code for providing either a portrait or landscape printing of the image data provided to the device driver. In addition, any display device drivers that support rotation of the displayed image have to be equipped to specifically handle any such rotation. Operating systems do not provide a software support to device drivers that enables the orientation of the output image to be manipulated. Consequently, independent hardware vendors must develop special device driver code for handling portrait/landscape mode on hard copy devices and 90/180 degree rotation for display devices.

It would be desirable to provide an operating system that provides a capability to rotate an image output to a device driver at rendering time. This would allow much simpler device driver software to be utilized in a computer system, while still having the capability of rotating an output image. Further, this would eliminate the need for redundant code being developed and included within each device driver package. Such capability would reduce the expense and complexity of output imaging devices. Still further, this would allow a user or the system to set a rotation for any output image sent to the peripheral device, regardless of what application sent the image. This would be particularly advantageous for a computer configured with a non-standard output device. For example, some personal digital assistant (PDA) hand-held computers have an aspect ratio that is narrower and longer than the standard computer monitor. Thus, it would be desirable to provide a mechanism that rotates all images output to the display of a PDA by ninety degrees, independent of the application sending the image.

SUMMARY OF THE INVENTION

According to the present invention, a method, operating system, and computer program product for manipulating the orientation of an output image of a data processing system are provided. The operating system of the present invention comprises means for providing a graphics engine within the operating system for modifying image data; means for specifying an output orientation for all images presented by an output device that is other than a default orientation; means for receiving image data in the operating system from an application executing in the data processing system; means for utilizing the graphics engine to modify the image data such that the image defined by the image data is oriented in the specified output orientation; and means for transferring the modified image data to a device driver that translates and transmits the transferred data to the output device to produce an output image, wherein the output image presented by the output device is oriented in the specified output orientation, wherein complex device drivers for manipulating the image's orientation are not required in the data processing system. The above as well as additional objects, features, and advantages of the present invention will become apparent in the following detailed written description.

BRIEF DESCRIPTION OF THE DRAWINGS

The novel features believed characteristic of the invention are set forth in the appended claims. However, the invention, as well as a preferred mode of use, and further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
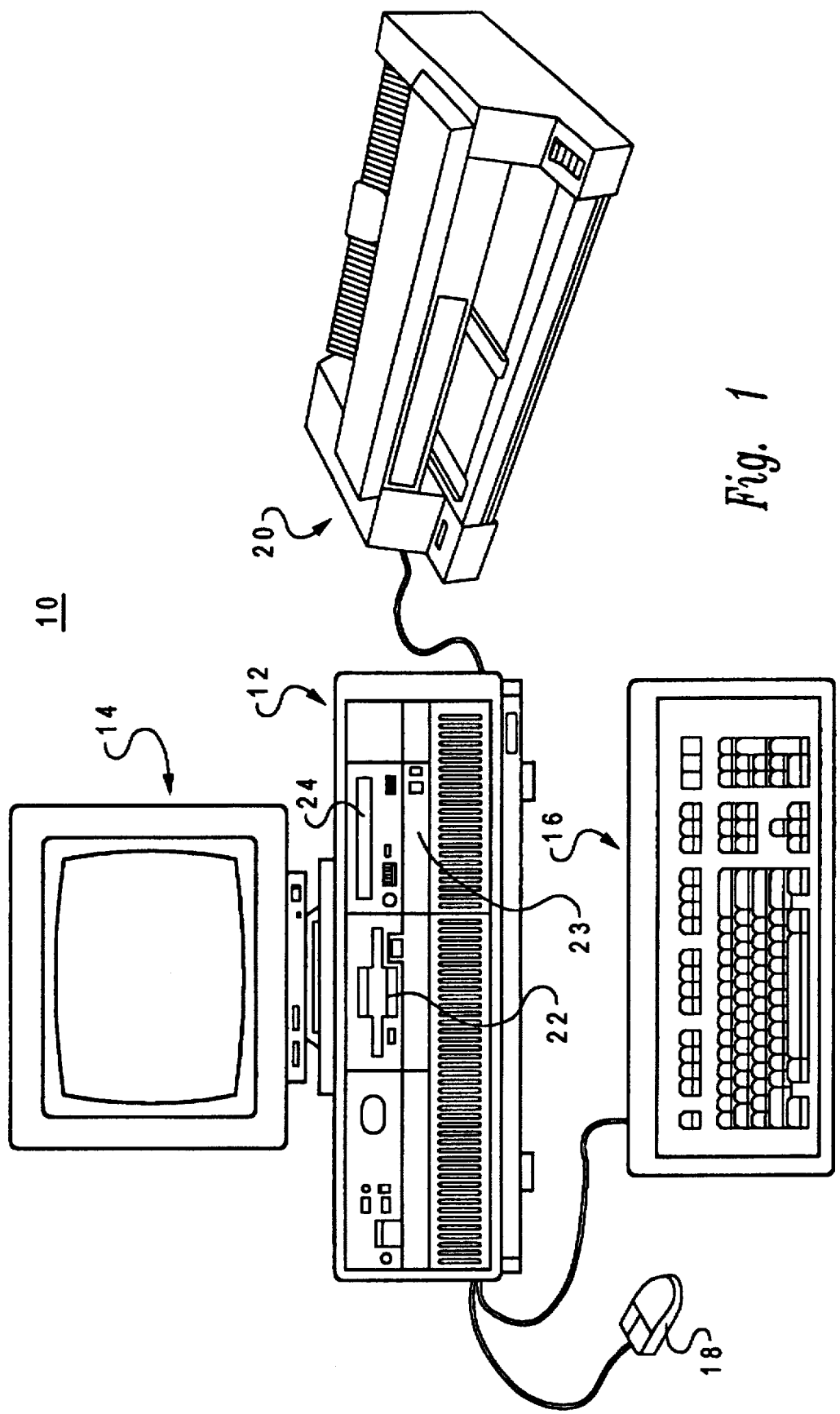
FIG. 1 illustrates a preferred embodiment of a data processing system which may be utilized to implement the present invention.

With reference now to the figures and in particular with reference to FIG. 1, there is illustrated a preferred embodiment of a data processing system which may be utilized to implement the present invention. As illustrated, data processing system 10 includes system unit 12, display device 14, keyboard 16, mouse 18, and printer 20. As is well-known in the art, system unit 12 receives data from input devices such as keyboard 16, mouse 18, or networking/telecommunication interfaces (not illustrated). Mouse 18 is preferably utilized in conjunction with a graphical user interface (GUI) in which system objects, including data processing system components and application programs, may be manipulated by mouse 18 through the selection and movement of associated graphical objects displayed within display device 14. To support storage and retrieval of data, system unit 12 further includes diskette drive 22, hard disk drive 23, and CD-ROM drive 24 all of which are connected to system unit 12 in a well-known manner. Those skilled in the art are aware that other conventional components can also be connected to system unit 12 for interaction therewith.

Figure 2:
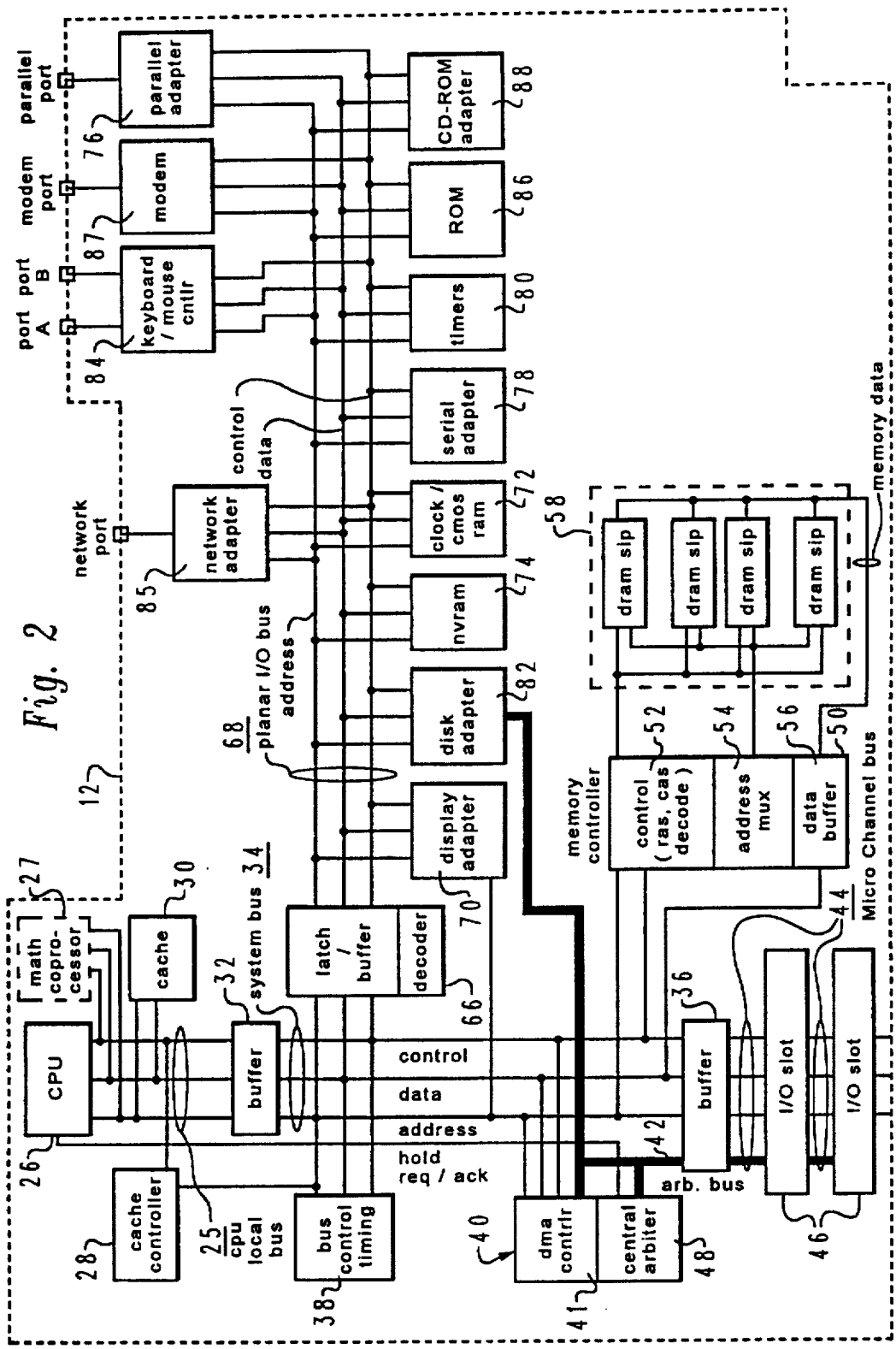
FIG. 2 depicts a block diagram of the principal components of the system unit of a preferred embodiment of a data processing system which may be utilized to implement the present invention.

Referring now to FIG. 2, there is depicted a block diagram of the principal components of system unit 12 in data processing system 10. As illustrated, system unit 12 includes a central processing unit (CPU) 26 which executes software instructions. While any appropriate microprocessor can be utilized for CPU 26, CPU 26 is preferably one of the PowerPC™ line of microprocessors available from IBM Microelectronics. Alternatively, CPU 26 could be implemented as one of the 80×86 line of microprocessors, which are available from a number of vendors.

In addition to CPU 26, an optional math coprocessor 27, cache controller 28, and cache memory 30 are coupled to a high-speed CPU local bus 25. Math coprocessor 27 is an optional processor, distinct from CPU 26, that performs numeric calculations with greater efficiency than CPU 26. Cache memory 30 comprises a small high-speed memory which stores frequently accessed data and instructions. The operation of cache 30 is controlled by cache controller 28, which maintains a directory of the contents of cache 30 and enforces a selected cache coherency protocol.

CPU local bus 25 is coupled to buffer 32 to provide communication between CPU local bus 25 and system bus 34, which extends between buffer 32 and a further buffer 36. System bus 34 is connected to bus control and timing unit 38 and direct memory access (DMA) unit 40, comprising central arbiter 48 and DMA controller 41. DMA controller 41 supports memory accesses that do not involve CPU 26. Direct memory accesses are typically employed to transfer data directly between RAM 58 and an "intelligent" peripheral device, such as disk adapter 82. DMA requests from multiple peripheral devices are arbitrated by central arbiter 48. As described below, central arbiter 48 also regulates access to devices coupled to Micro Channel bus 44 by control signals transmitted via arbitration control bus 42.

CPU 26 accesses data and instructions from and stores data to volatile random access memory (RAM) 58 through memory controller 50, which comprises memory control unit 50, address multiplexer 54, and data buffer 56. Memory control unit 52 generates read enable and write enable signals to facilitate storage and retrieval of data and includes address translation facilities that map virtual addresses utilized by CPU 26 into physical addresses within RAM 58. As will be appreciated by those skilled in the art, RAM 58 comprises a number of individual volatile memory modules which store segments of operating system and application software while power is supplied to data processing system 10. The software segments are partitioned into one or more virtual memory pages which each contain a uniform number of virtual memory addresses. When the execution of software requires more pages of virtual memory that can be stored within RAM 58, pages that are not currently needed are swapped with the required pages, which are stored within secondary storage, such as hard disk drive 23, which is controlled by disk adapter 82.

Memory controller 50 further includes address multiplexer 54, which selects particular addresses within RAM 58, and data buffer 56, which buffers data read from and stored to RAM 58. Memory controller 50 also provides memory protection that isolates system processes and user processes within the virtual address space allocated to each process. Thus, a program running in user mode can access only memory allocated to its virtual address space; the user mode program cannot access memory within another process's virtual address space unless memory sharing between the processes is supported and the program has the appropriate privileges for the access.

Still referring to FIG. 2, buffer 36 provides an interface between system bus 34 and an optional feature bus such as Micro Channel bus 44. Connected to Micro Channel bus 44 are a number of I/O slots 46 for receiving Micro Channel adapter cards which may be further connected to an I/O device or memory. Arbitration control bus 42 couples DMA controller 41 and central arbiter 48 to I/O slots 46 and disk adapter 82. By implementing the Micro Channel architecture bus arbitration protocol, central arbiter 48 regulates access to Micro Channel bus 44 by extension cards, controllers, and CPU 26. In addition, central arbiter 44 arbitrates for ownership of Micro Channel bus 44 among the bus masters coupled to Micro Channel bus 44. Bus master support allows multiprocessor configurations of Micro Channel bus 44 to be created by the addition of bus master adapters containing a processor and its support chips.

System bus 34 is coupled to planar I/O bus 68 through buffer 66. Attached to planar I/O bus 68 are a variety of I/O adapters and other peripheral components, including display adapter 70, disk adapter 82, nonvolatile RAM 74, clock 72, serial adapter 78, timers 80, read only memory (ROM) 86, CD-ROM adapter 88, network adapter 85, keyboard/mouse controller 84, modem 87 and parallel adapter 76. Display adapter 70 translates graphics data from CPU 26 into RGB video signals utilized to drive display device 14. Depending upon the operating system and application software running, the visual output may include text, graphics, animation, and multimedia video. Disk adapter 82 controls the storage of data to and the retrieval of data from hard disk drive 23 and diskette drive 22. Disk adapter 82 handles tasks such as positioning the read/write head and mediating between the drives and CPU 26. Non-volatile RAM 74 stores system configuration data that describes the present configuration of data processing system 10. For example, nonvolatile RAM 74 contains information that describes the capacity of hard disk drive 23 or a diskette placed within diskette drive 22, the type of display device 14, the amount of free RAM 58, and the present system configuration. These data are stored in non-volatile RAM when power is removed from data processing system 10.

Clock 72 is utilized by application programs executed by CPU 26 for time and day calculations. Serial adapter 76 provides a synchronous or asynchronous serial interface with external devices through a serial port (not shown), which enables data processing system 10 to transmit information to/from a serial communication device. Timers 80 comprise multiple interval timers which may be utilized to time a number of events within data processing system 10. As described above, timers 80 are among the devices directly controlled by some application programs, particularly games, which were written for a single-threaded operating system environment.

ROM 86 typically stores a basic input/output system (BIOS) which provides user-transparent I/O operations when CPU 26 is operating under the DOS operating system. BIOS also includes power on self-test (POST) diagnostic routines which perform system set-up at power on. For example, POST interrogates hardware, allocates a BIOS data area (BDA), constructs an interrupt vector table to point to interrupt handling routines within ROM 86, and initializes timers 80, clock 72 and other devices within system unit 12. CD-ROM adapter 88 controls the retrieval of data from CD-ROM drive 24, and CD-ROM 24A.

Parallel adapter 76 enables system unit 12 to output data in parallel to external devices such as printer 20 through a parallel port. Keyboard/mouse controller 84 interfaces system unit 12 with keyboard 16 and a pointing device, such as mouse 18. Such pointing devices are typically utilized to control an on-screen element, such as a graphical pointer that specifies the location of the pointer when the user presses a mouse button. Other pointing devices include a graphics tablet, stylus, light pen, joystick, puck, trackball, trackpad, and the pointing device sold by IBM under the trademark "TrackPoint".

Finally, system unit 12 includes network adapter 85 and modem 87, which facilitate communication between data processing system 10 and other data processing systems, including computer networks. Network adapter 85 is utilized to connect data processing system 10 to a computer network such as a local area network (LAN) connected to the network port. Computer networks support electronic transmission of data electronically over the network connection. Networks also support distributed processing, which enables data processing system 10 to share a task with other data processing systems linked to the network. Modem 87 provides modulation and demodulation of analog data communicated over a telecommunication line from and to a digital form. For example, a modem may be utilized to connect data processing system 10 to an on-line information service, such as the information service provided by Prodigy Services Corporation under the service mark "PRODIGY". Such on-line service providers offer software and data that can be downloaded into data processing system 10 via the modem. Furthermore, telephone communication through modem 87 provides a connection to other sources of software, such as a server, an electronic bulletin board, and the Internet or World Wide Web.

As described in detail below, aspects of the present invention pertain to specific methods or functions implementable on computer systems. These aspects of the present invention may be implemented as a computer program product for use with a computer system. Those skilled in the art should readily appreciate that computer programs defining the functions of the present invention can be delivered to a computer in many forms, which include, but are not limited to: (a) information permanently stored on non-writable storage media (e.g. read only memory devices within a computer such as ROM 86 or CD-ROM disks readable by a computer I/O attachment such as CD-ROM drive 24); (b) information alterably stored on writable storage media (e.g., floppy disks within diskette drive 22 or hard disk drive 23); or (c) information conveyed to a computer through communication media, such as through a computer network attached to network adapter 85 or a telecommunication line attached to modem 87. It should be understood, therefore, that such media, when carrying computer readable instructions that direct the method-functions of the present invention, represent alternate embodiments of the present invention.

Figure 3:
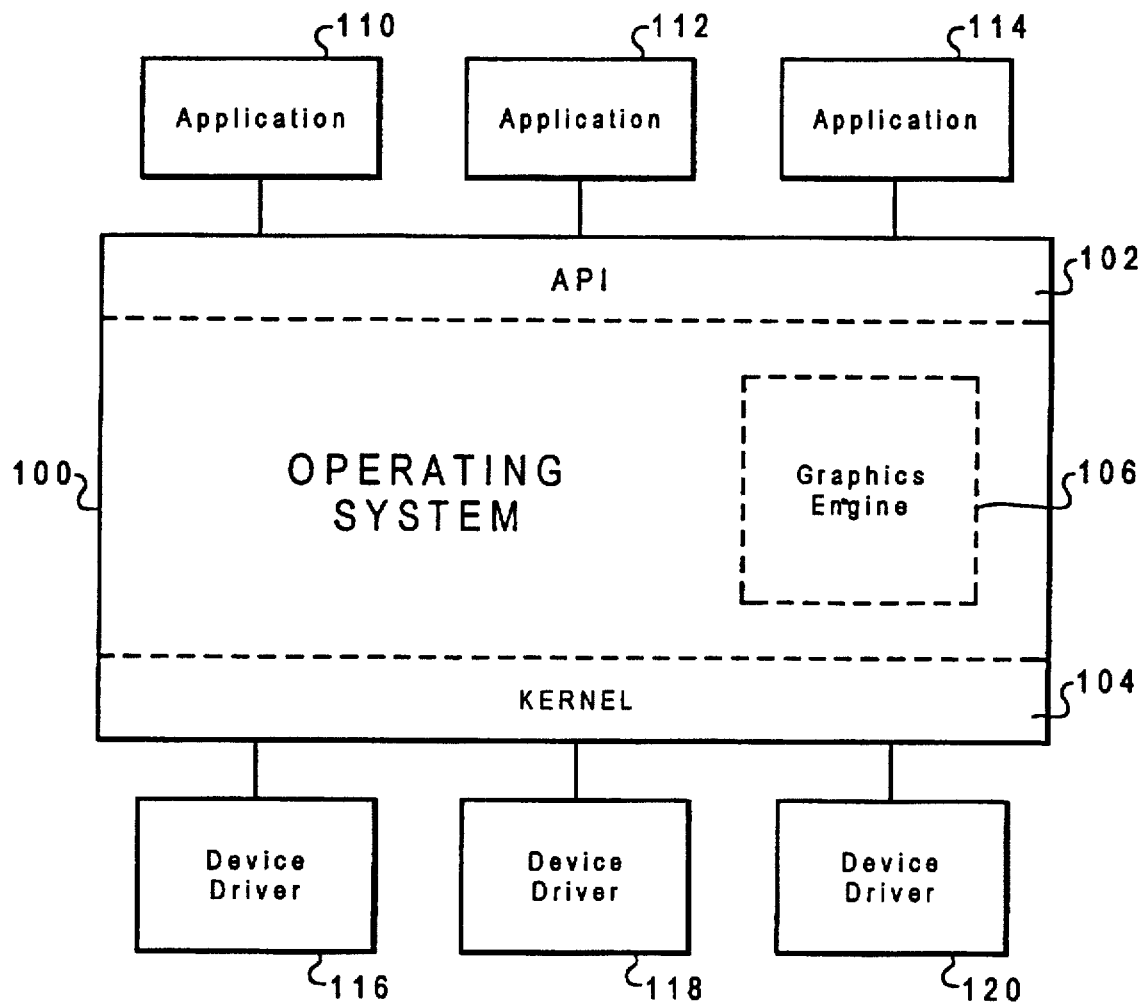
FIG. 3 depicts a block diagram showing the structure of the operating system of the present invention.

Referring now to FIG. 3, there is depicted a block diagram showing the structure of the operating system of the present invention. Operating system (OS) 100, applications 110-114, and device drivers 116-120 are computer programs being executed by system unit 12 in data processing system 10.

The operating system manages processors, memory, I/O devices, and networks and also provides interprocess communication, memory management, and process management. Within operating system 100 is application program interface (API) 102 that provides system calls enabling application programs to obtain services from the OS. The operating system directly implements the system calls received by the API. These operating system functions include filing systems, network capabilities, graphics display, and printing. Kernel 104 provides an interface with device drivers 116–120. Attached to each device driver is a peripheral device (not shown), such as a disk drive, network adapter, laser printer, or CRT display. The device drivers 116–120 have specialized communication and interfacing capabilities that allow communication with and control of the attached peripheral device. The device drivers accept requests to read or write data, or determine the status of the hardware, or to display a graphic image, and will control the attached peripheral device to carry out the request.

Graphics engine 106 within operating system 100 provides the capability to modify graphics or image data received from applications 110–114 through API 102. In particular, graphics engine 106 has the functionality to rotate a graphics image represented by the image data transferred to the operating system 100 from applications 110–114 when sent to a particular output device. Thus, in response to the user or system setting one or more rotation flags indicating all outputs to that particular peripheral device are to be rotated, the graphics engine will rotate the image, regardless of which application output the image.

According to the present invention, a user of data processing system 10 may specify an output orientation for all images presented by a particular output device that is other than a default orientation. So, for example, the user may specify, using a set-up utility in the operating system or the like, that the image presented on display 14 or the image printed on printer 20 is to be presented in a orientation other than the default orientation for those devices. In a preferred embodiment, the image rotation provided by graphics engine 106 includes three discreet rotations, namely 90, 180 and 270 degrees. Thus, for example, a user may specify that all images presented by an output device attached to device driver 120 are to be rotated 90 degrees. Thereafter, when anyone of applications 110–114 present image data and request that that data be output on the output device attached to device driver 120, operating system 100 will first transfer that image data to graphics engine 106 where the image will be rotated 90 degrees. The rotated image data is then transferred to device driver 120, which then translates and transmits the data to the output device to be presented. As will be appreciated by those skilled in the art, the image presented by the output device is now oriented in the output orientation specified by the user. This rotation of the images output from the output device has been performed by the graphics engine and not the device driver. Therefore, the operating system of the present invention does not require complex device drivers for rotating the image.

Figure 4:
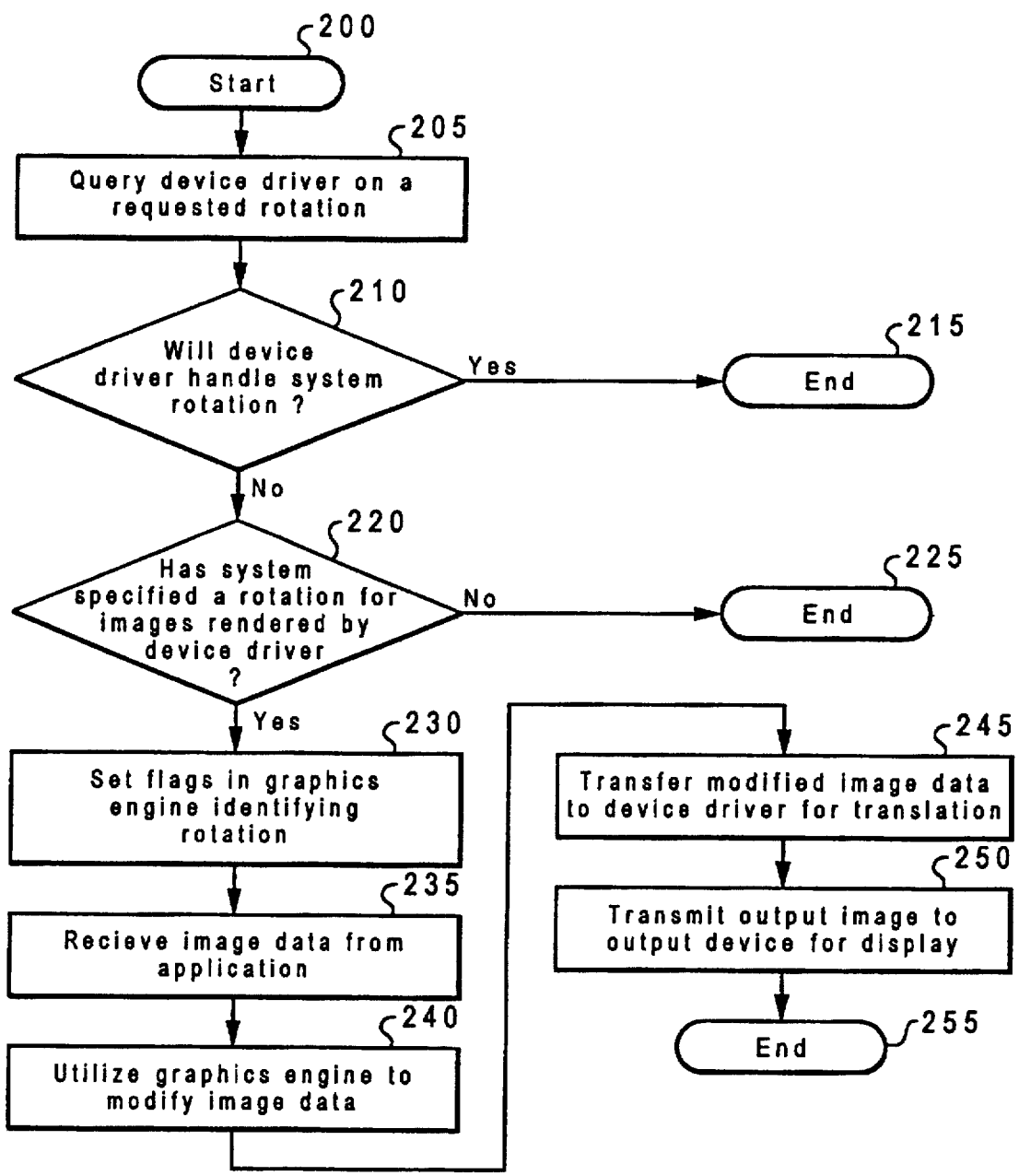
FIG. 4 shows a flow diagram of the method for manipulating the orientation of an output image of a data processing system having an operating system, in accordance with a preferred embodiment of the present invention.

Referring now to FIG. 4, there is shown a flow diagram of the method for manipulating the orientation of an output image of a data processing system having an operating system, in accordance with a preferred embodiment of the present invention. The process begins at step 200 and proceeds to step 205 where a device driver for a particular output device has been loaded into the system. The device driver is queried to determine if it can handle, or would prefer to handle, any system (or user) requested rotation of all images output to the attached output device. At decision block 210, a determination is made whether the device driver can or will handle any system specified rotation of the output image. If the answer is affirmative, the process ends at block 215.

If the determination is negative at block 210, the process proceeds to decision block 220 where it is determined if the rendered image is to be rotated. If the operating system has not received a request from the system or user to rotate all images being rendered for a particular output device, the process ends at step 225. If images presented on the output device are to be rotated by the operating system's graphics engine, the process proceeds to step 230 where the operating system sets one or more flags in the graphics engine identifying the type of rotation to be applied to all images being sent to the output device.

In a preferred embodiment of the present invention, there are two flags indicating image rotation: XYFLIP and VERTICAL SCAN. If the XYFLIP flag is set, the graphics engine will flip both the X-direction and the Y-direction relative to the origin for all primitives rendered to the output device (i.e. set -(X),-(Y) for all primitive values). If the VERTICAL SCAN flag is set, the graphics engine will perform a linear mapping of images in a Y (vertical) sequential order, instead of the normal X (horizontal) sequential order. In this way, a set XYFLIP flag rotates the image 180 degrees, and a set VERTICAL SCAN flag rotates the image 90 degrees. Further, if both the rotation flag bits, XYFLIP and VERTICAL SCAN, are set, the image is rotated 270 degrees.

Figure 5B:
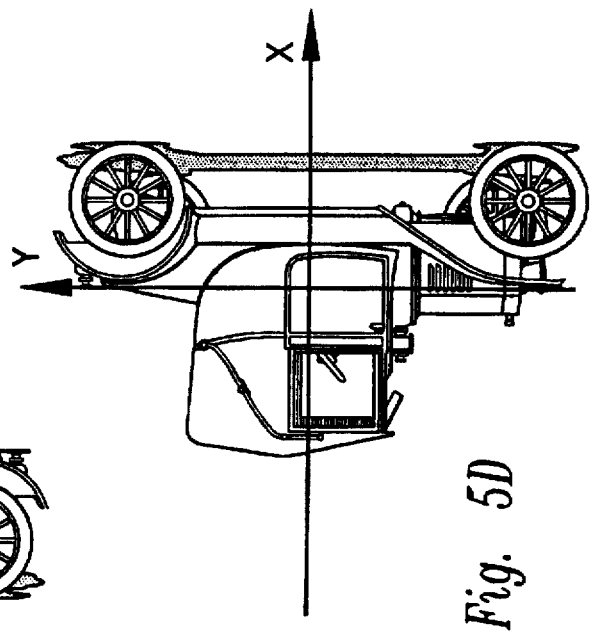
FIG. 5B depicts the graphic image rotated 90 degrees on the display of the data processing system, in accordance with the preferred embodiment of the present invention.
Figure 5D:
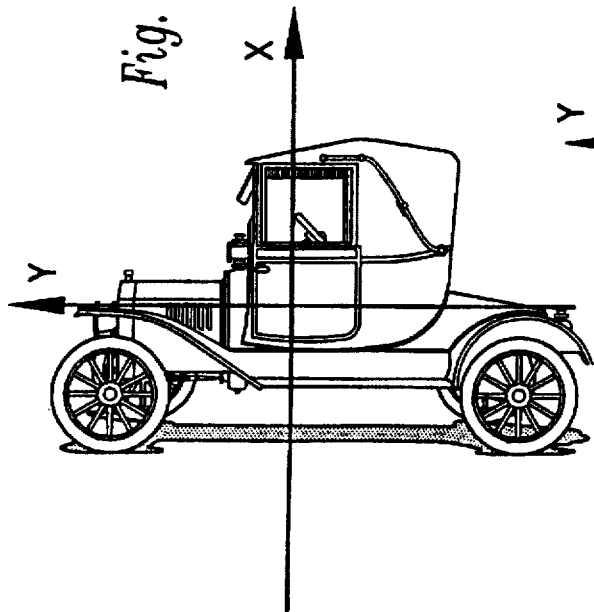
FIG. 5D depicts the graphic image rotated 270 degrees on the display of the data processing system, in accordance with the preferred embodiment of the present invention.
Figure 5A:
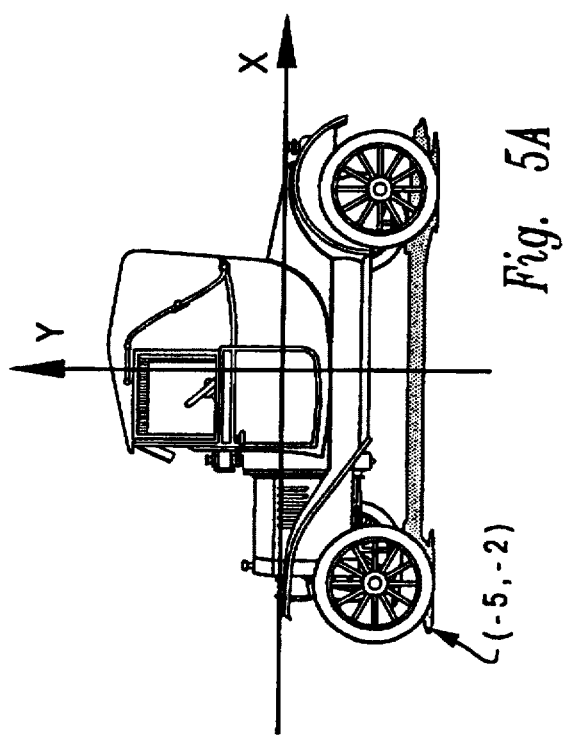
FIG. 5A depicts a graphic image being displayed on an output device of the data processing system of the present invention.
Figure 5C:
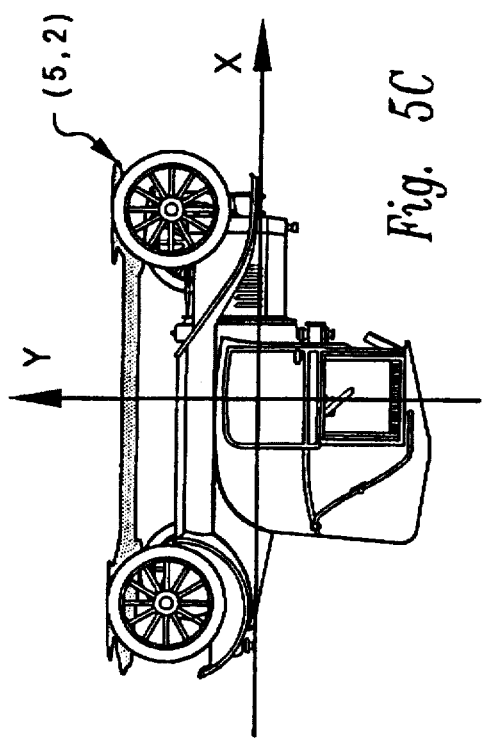
FIG. 5C depicts the graphic image rotated 180 degrees on the display of the data processing system, in accordance with the preferred embodiment of the present invention.

Referring to FIGS. 5A–5D, there is depicted a graphic image rotated 0°, 90°, 180°, and 270°, respectively, on a CRT display in the computer of the present invention. As seen in FIG. 5A, the graphic image displayed by the computer is of an early 20th century automobile. This image has been rendered to the display using low level primitives such as a line draw or bitmap transfer to form the graphic image of the automobile. In a preferred embodiment of the present invention, the image data for the bitmap image is mapped to the display in Cartesian coordinates. Accordingly, X-Y axes are also shown in the FIGS. overlaying the displayed image. So, for example, the bitmap primitive indicated in FIG. 5A is located at X=−5 and Y=−2, or (−5, −2) in the screen's Cartesian coordinate system. FIG. 5B shows the display of the graphic image after being rotated 90° clockwise. This is accomplished in the computer of the present invention by the user setting the VERTICAL SCAN bit, which causes the graphics engine to map each horizontal scan line of the image to a vertical column from top-to-bottom of the screen. This rotated image is then output to the CRT display device driver as a standard output image. As seen in FIG. 5C, the output image has been rotated 180° from the original image orientation output from the graphics application. Therefore, the user or system has set the XYFLIF bit, and the graphics engine, detecting the set XYFLIP bit, has rotated the orientation of the graphics image by 180. In a preferred embodiment of the present invention, a graphics image is mapped to Cartesian coordinates, so the graphics engine inverts the sign bit of each of the Cartesian coordinates for every primitive of the graphics image. For example, the primitive located at (−5, −2) in FIG. 5A would be remapped to (5, 2) on the output display as seen in FIG. 5C. As this is done for each low level primitive of the bitmap image, the output image will be rotated 180° from the orientation output by the application. Finally, referring to FIG. 5D, the graphics image has been rotated 270° upon display in the computer of the present invention. Here, both rotation flag bits have been set and the graphics engine has flipped the automobile's primitives in both the X-direction and the Y-direction and then has remapped the horizontal scan lines of the automobile to vertical columns of the display.

As will be appreciated by those skilled in the art, the images received by the graphics engine of the present invention may be mapped to other coordinate systems. Accordingly, as will be appreciated by those skilled in the art, the graphics engine of the present invention would have to perform an appropriate transformation of the graphics data to implement the various rotations. Therefore, in other preferred embodiments of the present invention, the graphics engine will perform the appropriate operations, which will be readily apparent to those skilled in the art, to implement the desired rotation as indicated by the rotation flag bits (i.e., XYFLIP, VERTICAL SCAN).

Referring back to FIG. 4, image data is received by the operating system from an application executing in the data processing system at step 235. Because the flag(s), set at step 230 specify an output orientation for all images presented by the output device that is other than the default orientation (i.e., zero degrees rotation), the operating system utilizes the graphics engine to modify the image data such that the image defined by the image data is oriented as specified by the set flag(s), at step 240. Here, the graphics engine notifies its lower level primitive functions of the rendering modifications for rotation. These lower level primitive functions are selected subroutines for rendering low level primitives that form the modified image data. As described herein, the low level primitives are bitmap transfers and line draws. All other primitives are mapped to these two low level drawing primitives. At step 245, this modified image data is transferred to the device driver for the output device, which translates the modified image data into the appropriate commands for driving the output device. These commands are then transmitted to the output device, as seen at step 250, which produces an output image oriented in the specified rotation. The process then ends at step 255.

In summary, the present invention has provided operating system support to rotate an image output to a device driver at rendering time for printing in portrait or landscape mode and for displaying the image in increments of 90 decree rotations. A user or system can set a rotation for any output image sent to the peripheral device, regardless of what application provides the image. This allows for much simpler device driver software to be utilized in a computer system, while still having the capability of rotating all output images sent to a particular output device. Thus, the present invention has eliminated the need for redundant code for rotation within each device driver package. This significantly reduces the expense and complexity of output imaging devices.

While the invention has been particularly shown and described with reference to a preferred embodiment, it will be understood by those skilled in the art that various changes in form and detail may be made therein without departing from the spirit and scope of the invention.

What is claimed is:

1. A method for manipulating the orientation of an output image of a data processing system having an operating system, the method comprising the steps of:

providing a graphics engine within the operating system for modifying image data;

specifying an output orientation for all images presented by an output device that is other than a default orientation;

receiving image data in the operating system from an application executing in the data processing system;

in response to a device driver notifying the operating system that the image is to be output in a specified output orientation other than the default orientation, utilizing the graphics engine to modify the image data such that the image defined by the image data is oriented in the specified output orientation;

transferring the modified image data to a device driver that translates and transmits the transferred data to the output device to produce an output image, wherein the output image presented by the output device is oriented in the specified output orientation; and wherein complex device drivers for manipulating the image's orientation are not required in the data processing system.

2. A method for manipulating the orientation of an output image of a data processing system according to claim 1, wherein said graphics engine includes selected subroutines for rendering low level primitives that form the modified image data.

3. A method for manipulating the orientation of an output image of a data processing system according to claim 2, wherein the graphics engine sets one or more flags, which identify a rotation of the image, and wherein the selected subroutines perform the identified rotation on all primitives rendered.

4. An operating system for manipulating the orientation of an output image of a data processing system, comprising:

means for providing a graphics engine within the operating system for modifying image data;

means for specifying an output orientation for all images presented by an output device that is other than a default orientation;

means for receiving image data in the operating system from an application executing in the data processing system;

means, responsive to a device driver notifying the operating system that the image is to be output in a specified output orientation other than the default orientation, for utilizing the graphics engine to modify the image data such that the image defined by the image data is oriented in the specified output orientation;

means for transferring the modified image data to a device driver that translates and transmits the transferred data to the output device to produce an output image, wherein the output image presented by the output device is oriented in the specified output orientation; and wherein complex device drivers for manipulating the image's orientation are not required in the data processing system.

5. An operating system for manipulating the orientation of an output image of a data processing system according to claim 4, wherein said graphics engine includes selected subroutines for rendering low level primitives that form the modified image data.

6. An operating system for manipulating the orientation of an output image of a data processing system according to claim 3, wherein the graphics engine sets one or more flags, which identify a rotation of the image, and wherein the selected subroutines perform the identified rotation on all primitives rendered.

7. A computer program product comprising:

a computer usable medium having computer readable program code means embodied in the medium for manipulating the orientation of an output image of a data processing system having an operating system, the computer program product including:

computer readable program code means for providing a graphics engine within the operating system for modifying image data;

computer readable program code means for specifying an output orientation for all images presented by an output device that is other than a default orientation;

computer readable program code means for receiving image data in the operating system from an application executing in the data processing system;

computer readable program code means, responsive to a device driver notifying the operating system that the image is to be output in a specified output orientation other than the default orientation, for utilizing the graphics engine to modify the image data such that the image defined by the image data is oriented in the specified output orientation;

computer readable program code means for transferring the modified image data to a device driver that translates and transmits the transferred data to the output device to produce an output image, wherein the output image presented by the output device is oriented in the specified output orientation; and wherein complex device drivers for manipulating the image's orientation are not required in the data processing system.

8. A computer program product for manipulating the orientation of an output image of a data processing system according to claim 7, wherein said graphics engine includes selected subroutines for rendering low level primitives that form the modified image data.

9. A computer program product for manipulating the orientation of an output image of a data processing system according to claim 8, wherein the graphics engine sets one or more flags, which identify a rotation of the image, and wherein the selected subroutines perform the identified rotation on all primitives rendered.

* * * * *